United States Patent
Chang (10) Patent No.: US 10,144,790 B2
(45) Date of Patent: *Dec. 4, 2018

(54) INTERNAL DONOR STRUCTURE FOR OLEFIN POLYMERIZATION CATALYSTS AND METHODS OF MAKING AND USING SAME

(71) Applicant: W.R. Grace & Co.-Conn., Columbia, MD (US)

(72) Inventor: Main Chang, Houston, TX (US)

(73) Assignee: W.R. Grace & Co.-Conn., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,829

(22) Filed: Jan. 17, 2017

(65) Prior Publication Data
US 2017/0121433 A1    May 4, 2017

Related U.S. Application Data

(60) Continuation of application No. 14/944,587, filed on Nov. 18, 2015, now Pat. No. 9,567,410, which is a continuation of application No. 14/255,050, filed on Apr. 17, 2014, now Pat. No. 9,217,047, which is a division of application No. 13/307,215, filed on Nov. 30, 2011, now Pat. No. 8,765,626.

(51) Int. Cl.
C08F 4/651 (2006.01)
C08F 110/06 (2006.01)
C08F 4/649 (2006.01)

(52) U.S. Cl.
CPC .......... *C08F 110/06* (2013.01); *C08F 4/6494* (2013.01)

(58) Field of Classification Search
None
See application file for complete search history.

(56) References Cited

U.S. PATENT DOCUMENTS

| | | | |
|---|---|---|---|
| 4,618,661 A | 10/1986 | Kaus et al. | |
| 5,723,400 A | 3/1998 | Morini et al. | |
| 6,395,670 B1 | 5/2002 | Morini et al. | |
| 6,825,309 B2 | 11/2004 | Morini et al. | |
| 7,351,778 B2 | 4/2008 | Gao et al. | |
| 7,388,061 B2 | 6/2008 | Gao et al. | |
| 7,399,812 B2 | 7/2008 | Xie et al. | |
| 7,592,286 B2 | 9/2009 | Morini et al. | |
| 8,685,879 B2 | 4/2014 | Spencer et al. | |
| 9,156,927 B2 | 10/2015 | Gao et al. | |
| 2001/0021687 A1 | 9/2001 | Kumamoto et al. | |
| 2004/0039139 A1 | 2/2004 | Lu et al. | |
| 2010/0168350 A1 | 7/2010 | Brita et al. | |
| 2010/0222528 A1 | 9/2010 | Fushini et al. | |
| 2012/0157295 A1 | 6/2012 | Chen et al. | |
| 2012/0157642 A1* | 6/2012 | Chen | C08F 10/00 526/209 |

FOREIGN PATENT DOCUMENTS

| | | |
|---|---|---|
| CN | 101759564 | 6/2010 |
| WO | 2007096255 | 8/2007 |
| WO | 20120087527 | 6/2012 |
| WO | 20120087531 | 6/2012 |
| WO | 20120175425 | 12/2012 |

OTHER PUBLICATIONS

An English translated Abstract cited from STN. Solodovnikov et al. Plasticheskie Massy, 1989, 3, 22-5.
Solodovnikov et al. Plasticheskie Massy, 1989, 3, 22-5.
An English translated Abstract cited from STN. Maier, et al., Plasticheskie Massy, 1988, 11, 4-6.
International Search Report for International Application PCT/US2012/069220, dated Mar. 15, 2013, 3 pgs.

* cited by examiner

*Primary Examiner* — Yun Qian
(74) *Attorney, Agent, or Firm* — Lowenstein Sandler LLP (57) ABSTRACT

The presently disclosed and claimed inventive concept(s) relates to solid catalyst components comprising titanium, magnesium, halogen and an internal electron donor compound having at least one ester group and at least one alkoxy group, and catalyst systems containing the catalyst solid components, organoaluminum compounds, and organosilicon compounds. The presently disclosed and claimed inventive concept(s) further relates to methods of making the catalyst components and the catalyst systems, and methods of polymerizing or copolymerizing alpha-olefins using the catalyst systems.

11 Claims, 3 Drawing Sheets

INTERNAL DONOR STRUCTURE FOR OLEFIN POLYMERIZATION CATALYSTS AND METHODS OF MAKING AND USING SAME

CROSS-REFERENCE TO RELATED APPLICATIONS

This application is a continuation application of U.S. patent application Ser. No. 14/944,587, filed on Nov. 18, 2015, which is a continuation application of U.S. patent application Ser. No. 14/255,050, filed on Apr. 17, 2014, which is a divisional application of U.S. patent application Ser. No. 13/307,215, filed on Nov. 30, 2011, the disclosures of which are hereby incorporated by reference herein in their entireties.

TECHNICAL FIELD

The presently disclosed and claimed inventive concept(s) relates generally to solid catalyst components for olefin polymerization. In particular, the solid catalyst components comprise titanium, magnesium, halogen and internal electron donor compounds containing at least one ester group and at least one alkoxy group. The presently disclosed and claimed inventive concept(s) further relates to catalyst systems containing the solid catalyst components, methods of making the solid catalyst components and the catalyst systems, and methods of polymerizing or copolymerizing alpha-olefins using the catalyst systems.

BACKGROUND

Polyolefins are a class of polymers derived from simple olefins. Known methods of making polyolefins involve the use of Ziegler-Natta polymerization catalysts. These catalysts polymerize vinyl monomers using a transition metal halide to provide a polymer with an isotactic stereochemical configuration.

Two types of Ziegler-Natta catalyst systems are traditionally used for the polymerization or copolymerization of olefins. The first, in its broadest definition, comprises $TiCl_3$ based catalysts components obtained, for example, by the reduction of $TiCl_4$ with Al-alkyls, used in combination with Al-compounds such as diethylaluminum chloride (DEAC). Despite the modest properties of the resulting polymers in terms of isotacticity, the catalysts are characterized by a very low activity which results in the presence of large amounts of catalytic residues in the polymers.

The second type of catalyst system comprises a solid catalyst component, constituted by magnesium dihalide on which are supported a titanium compound and an internal electron donor compound. In order to maintain the high selectivity for an isotactic polymer product, a variety of internal electron donor compounds must be added during the catalyst synthesis. Conventionally, when a higher crystallinity of the polymer is required, an external donor compound is also added during the polymerization reaction. Both the internal and external electron donor compounds become indispensible compositions of catalyst components.

During the past 30 years, numerous supported Ziegler-Natta catalysts have been developed which afford a much higher activity in olefin polymerization reactions and significantly higher contents of crystalline isotactic fractions in the polymers they produce. With the development of new internal and external electron donor compounds, polyolefin catalyst systems have been continuously improved.

SUMMARY

The following presents a simplified summary of the presently disclosed and claimed inventive concept(s) in order to provide a basic understanding of some aspects of the presently disclosed and claimed inventive concept(s). This summary is not an extensive overview of the presently disclosed and claimed inventive concept(s). It is intended to neither identify key or critical elements of the presently disclosed and claimed inventive concept(s) nor delineate the scope of the presently disclosed and claimed inventive concept(s). Rather, the purpose of this summary is to present various concepts of the presently disclosed and claimed inventive concept(s) in a simplified form as a prelude to the more detailed description that is presented hereafter.

The presently disclosed and claimed inventive concept(s) provides a solid catalyst component for use in olefin polymerization, an olefin polymerization catalyst system containing the solid catalyst component, methods of making the solid catalyst component and the catalyst system, and methods of polymerizing and/or copolymerizing olefins involving the use of the catalyst system. The solid catalyst component comprises titanium, magnesium, halogen, and an internal electron donor compound containing at least one ester group and one alkoxy group. The internal electron donor compound comprises a compound represented by a general formula (I):

wherein, $R_1$ is a cycloaliphatic group comprising from about 3 to about 20 carbon atoms, an aryl group comprising from about 6 to about 20 carbon atoms, an alkylaryl group comprising from about 7 to about 20 carbon atoms, or an arylalkyl group comprising from about 7 to about 20 carbon atoms; and $R_2$ and $R_3$ are identical or different and are each independently a substituted or unsubstituted hydrocarbyl having 1 to about 20 carbon atoms.

A catalyst systems can contain a solid catalyst component comprising titanium, magnesium, halogen and an internal electron donor compound containing at least one ester group and one alkoxy group; an organoaluminum compound; and an organosilicon compound. The internal electron donor compound comprises a compound represented by the general formula (I). A solid catalyst component can be made by contacting a magnesium compound and a titanium compound with an internal electron donor compound containing at least one ester group and one alkoxy group. The internal electron donor compound can be represented by the general formula (I). A method of polymerizing or copolymerzing olefins involve contacting olefins with a catalyst system containing a solid catalyst component comprising titanium, magnesium, halogen and an internal electron donor compound that can be represented by the general formula (I), an organoaluminum compound, and an organosilicon compound.

In order to achieve the foregoing and related ends, the presently disclosed and claimed inventive concept(s) involves the features hereinafter fully described and particularly pointed out in the claims. The following description and the annexed drawings set forth in detail certain illustrative aspects and implementations of invention. These are indicative, however, of but a few of the various ways in which the principles of the presently disclosed and claimed inventive concept(s) may be employed. Other objects, advantages and novel features of the presently disclosed and claimed inventive concept(s) will become apparent from the following detailed description of the presently disclosed and claimed inventive concept(s) when considered in conjunction with the drawings and one of ordinary skill in the art would appreciate such additional objects, advantages, and novel features given in the present disclosure.

DETAILED DESCRIPTION

The presently disclosed and claimed inventive concept(s) relates to solid catalyst components containing titanium, magnesium, halogen and internal electron donor compounds containing at least one ester group and at least one alkoxy group in olefinic polymerization; olefin polymerization catalyst systems containing the solid catalyst components, organoaluminums, and organosilicons; methods of making the solid catalyst components and the catalyst systems; and methods of polymerizing and/or copolymerizing olefins using the catalyst systems.

An aspect of the presently disclosed and claimed inventive concept(s) is a solid catalyst component comprising titanium, magnesium, halogen and an internal electron donor compound containing at least one ester group and at least one alkoxy group. In one embodiment, the solid catalyst component comprises a titanium compound having at least one titanium-halogen bond and an internal electron donor compound containing at least one ester group and at least on alkoxy group supported on a magnesium halide crystal lattice. The titanium compound is $TiCl_4$ or $TiCl_3$. In one embodiment, the magnesium halide crystal lattice is a magnesium dichloride crystal lattice, which is widely known by one of ordinary skill in the art as a support for Ziegler-Natta catalysts.

The solid catalyst component of the presently disclosed and claimed inventive concept(s) is an active catalyst component comprising a reaction product of a titanium compound, a magnesium compound, and an internal electron donor compound containing at least one ester group and at least one alkoxy group. The titanium compounds used in the preparation of the solid catalyst component include, for example, a tetravalent titanium compound represented by chemical formula (II):

$$Ti(OR)_gX_{4-g} \quad \text{(II)}$$

wherein R represents a hydrocarbon group, preferably an alkyl group having 1 to about 20 carbon atoms, X represents a halogen atom, and $0 \le g \le 4$. Specific examples of the titanium compound include, but are not limited to, titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{-}i\text{-}C_4H_9)Br_3$; dialkoxytitanium dihalides such as $Ti(OCH_3)_2Cl_2$, $Ti(OC_2H_5)_2Cl_2$, $Ti(O\text{-}n\text{-}C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O\text{-}n\text{-}C_4H_9)_3Cl$ and $Ti(OC_2H_5)_3Br$; and tetraalkoxytitaniums such as $Ti(OCH_3)_4$, $Ti(OC_2H_5)_4$ and $Ti(O\text{-}n\text{-}C_4H_9)_4$. Among these, the halogen containing titanium compounds, especially titanium tetrahalides, have been found to be useful for at least one embodiment. These titanium compounds may be used individually or in solutions of hydrocarbon compounds or halogenated hydrocarbons.

The magnesium compounds used in the preparation of the solid catalyst component include halogen containing magnesium compounds. Specific examples of the magnesium compounds include, but are not limited to, magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and carboxylic acid salts of magnesium such as magnesium laurate and magnesium stearate. These magnesium compounds may be in the liquid or solid state.

In one embodiment, the halogen containing magnesium compounds, such as magnesium chloride, alkoxy magnesium chlorides and aryloxy magnesium chlorides, are employed.

When preparing the solid catalyst component, an internal electron donor can be added to the preparation and/or may form the solid catalyst component itself and/or other constituents. The solid titanium catalyst component can be made by contacting a magnesium compound and a titanium compound with an internal electron donor compound. In one embodiment, the solid titanium catalyst component is made by contacting a magnesium compound and a titanium compound in the presence of an internal electron donor compound. In another embodiment, the solid titanium catalyst component is made by forming a magnesium based support optionally with the titanium compound and optionally with the internal electron donor compound, and contacting the magnesium based support with the titanium compound and the internal electron donor compound.

The internal electron donor compound comprises at least one least one ester group and at least one alkoxy group and can be represented by the following chemical formula (I):

wherein $R_1$ is a cycloaliphatic group comprising from about 3 to about 20 carbon atoms, an aryl group comprising from about 6 to about 20 carbon atoms, an alkylaryl group comprising from about 7 to about 20 carbon atoms, or an arylalkyl group comprising from about 7 to about 10 carbon atoms; and $R_2$ and $R_3$ are identical or different and are each independently a substituted or unsubstituted hydrocarbyl having 1 to about 20 carbon atoms.

In one embodiment, $R_2$ and $R_3$ are identical or different and each may independently be a linear or branched alkyl group comprising from 1 to about 20 carbon atoms, a cycloaliphatic group comprising from about 3 to about 20 carbon atoms, an aryl group comprising from about 6 to about 20 carbon atoms, an alkylaryl group comprising from about 7 to about 20 carbon atoms, or an arylalkyl group comprising from about 7 to about 20 carbon atoms.

The internal electron donor compound comprises, in one embodiment, at least one ester group and at least one alkoxy group and can also be represented by the following chemical formula (III):

(III)

wherein $R_1$ and $R_2$ are independently hydrogen, $C_1$-$C_{20}$ linear or branched alkyl, $C_3$-$C_{20}$ cycloalkyl, phenyl, $C_7$-$C_{10}$ arylalkyl, or $C_7$-$C_{18}$ alkylaryl groups; and $R_3$-$R_7$ are independently hydrogen, or $C_1$-$C_4$ linear or branched alkyl.

In one embodiment, the internal electron donor compound comprises at least one selected from the group consisting of 1-alkyl-2-methoxy ethylbenzoate, 1-alkyl-2-methoxy ethyl 2-alkylbenzoate, 1-alkyl-2-methoxy ethyl 3-alkylbenzoate, 1-alkyl-2-methoxy ethyl 4-alkylbenzoate and 1-alkyl-2-methoxy ethyl 3,5-dialkylbenzoate.

Specific examples of the 1-alkyl-2-methoxy ethylbenzoate include, but are not limited to, 1-ethyl-2-methoxy ethylbenzoate, 1-propyl-2-methoxy ethylbenzoate, 1-isopropyl-2methoxy ethylbenzoate, 1-t-butyl-2-methoxy ethylbenzoate, 1-isobutyl-2-methoxy ethylbenzoate, 1-n-butyl-2-methoxy ethylbenzoate, 1-n-pentyl-2-methoxy ethylbenzoate, 1-isopentyl-2-methoxy ethylbenzoate, 1-n-hexyl-2-methoxy ethylbenzoate, 1-isohexyl-2-methoxy ethylbenzoate, 1-n-heptyl-2-methoxy ethylbenzoate, 1-iso-heptyl-2-methoxy ethylbenzoate, 1-n-octyl-2-methoxy ethylbenzoate, 1-isooctyl-2-methoxy ethylbenzoate, 1-nonyl-2-methoxy ethylbenzoate, and 1-isononyl-2-methoxy ethylbenzoate.

Specific examples of the 1-alkyl-2-methoxy ethyl 2-alkylbenzoate include, but are not limited to, 1-ethyl-2-methoxy ethyl 2-methylbenzoate, 1-ethyl-2-methoxy ethyl 2-ethylbenzoate, 1-ethyl-2-methoxy ethyl 2-propylbenzoate, 1-ethyl-2-methoxy ethyl 2-butylbenzoate, 1-propyl-2-methoxy ethyl 2-methylbenzoate, 1-propyl-2-methoxy ethyl 2-ethylbenzoate, 1-propyl-2-methoxy ethyl 2-propylbenzoate, 1-propyl-2-methoxy ethyl 2-butylbenzoate, 1-isopropyl-2-methoxy ethyl 2-methylbenzoate, 1-isopropyl-2-methoxy ethyl 2-ethylbenzoate, 1-isopropyl-2-methoxy ethyl 2-propyllbenzoate, 1-isopropyl-2-methoxy ethyl 2-butylbenzoate, 1-t-butyl-2-methoxy ethyl 2-methylbenzoate, 1-t-butyl-2-methoxy ethyl 2-ethylbenzoate, 1-t-butyl-2-methoxy ethyl 2-propylbenzoate, 1-t-butyl-2-methoxy ethyl 2-butylbenzoate, 1-isobutyl-2-methoxy ethyl 2-methylbenzoate, 1-isobutyl-2-methoxy ethyl 2-ethylbenzoate, 1-isobutyl-2-methoxy ethyl 2-propylbenzoate, 1-isobutyl-2-methoxy ethyl 2-butylbenzoate, 1-n-butyl-2-methoxy ethyl 2-methylbenzoate, 1-n-butyl-2-methoxy ethyl 2-ethylbenzoate, 1-n-butyl-2-methoxy ethyl 2-propylbenzoate, 1-n-butyl-2-methoxy ethyl 2-butylbenzoate, 1-n-pentyl-2-methoxy ethyl 2-methylbenzoate, 1-n-pentyl-2-methoxy ethyl 2-ethylbenzoate, 1-n-pentyl-2-methoxy ethyl 2-propylbenzoate, 1-n-pentyl-2-methoxy ethyl 2-butylbenzoate, 1-isopentyl-2-methoxy ethyl 2-methylbenzoate, 1-isopentyl-2-methoxy ethyl 2-ethylbenzoate, 1-isopentyl-2-methoxy ethyl 2-propylbenzoate, 1-isopentyl-2-methoxy ethyl 2-butylbenzoate, 1-n-hexyl-2-methoxy ethyl 2-methylbenzoate, 1-n-hexyl-2-methoxy ethyl 2-ethylbenzoate, 1-n-hexyl-2-methoxy ethyl 2-propylbenzoate, 1-n-hexyl-2-methoxy ethyl 2-butylbenzoate, 1-isohexyl-2-methoxy ethyl 2-methylbenzoate, 1-isohexyl-2-methoxy ethyl 2-ethylbenzoate, 1-isohexyl-2-methoxy ethyl 2-propylbenzoate, 1-isohexyl-2-methoxy ethyl 2-butylbenzoate, 1-n-heptyl-2-methoxy ethyl 2-methylbenzoate, 1-n-heptyl-2-methoxy ethyl 2-ethylbenzoate, 1-n-heptyl-2-methoxy ethyl 2-propylbenzoate, 1-n-heptyl-2-methoxy ethyl 2-butylbenzoate, 1-isoheptyl-2-methoxy ethyl 2-methylbenzoate, 1-isoheptyl-2-methoxy ethyl 2-ethylbenzoate, 1-isoheptyl-2-methoxy ethyl 2-propylbenzoate, 1-isoheptyl-2-methoxy ethyl 2-butylbenzoate, 1-n-octyl-2-methoxy ethyl 2-methylbenzoate, 1-n-octyl-2-methoxy ethyl 2-ethylbenzoate, 1-n-octyl-2-methoxy ethyl 2-propylbenzoate, 1-n-octyl-2-methoxy ethyl 2-butylbenzoate, 1-isooctyl-2-methoxy ethyl 2-methylbenzoate, 1-isooctyl-2-methoxy ethyl 2-ethylbenzoate, 1-isooctyl-2-methoxy ethyl 2-propylbenzoate, 1-isooctyl-2-methoxy ethyl 2-butylbenzoate, 1-nonyl-2-methoxy ethyl 2-methylbenzoate, 1-nonyl-2-methoxy ethyl 2-ethylbenzoate, 1-nonyl-2-methoxy ethyl 2-propylbenzoate, 1-nonyl-2-methoxy ethyl 2-butylbenzoate, 1-i-nonyl-2-methoxy ethyl 2-methylbenzoate, 1-i-nonyl-2-methoxy ethyl 2-ethylbenzoate, 1-i-nonyl-2-methoxy ethyl 2-propylbenzoate, and 1-i-nonyl-2-methoxy ethyl 2-butylbenzoate.

Specific examples of the 1-alkyl-2-methoxy ethyl 3-alkylbenzoate include, but are not limited to, 1-ethyl-2-methoxy ethyl 3-methylbenzoate, 1-ethyl-2-methoxy ethyl 3-ethylbenzoate, 1-ethyl-2-methoxy ethyl 3-propylbenzoate, 1-ethyl-2-methoxy ethyl 3-butylbenzoate, 1-propyl-2-methoxy ethyl 3-methylbenzoate, 1-propyl-2-methoxy ethyl 3-ethylbenzoate, 1-propyl-2-methoxy ethyl 3-propylbenzoate, 1-propyl-2-methoxy ethyl 3-butylbenzoate, 1-isopropyl-2-methoxy ethyl 3-methylbenzoate, 1-isopropyl-2-methoxy ethyl 3-ethylbenzoate, 1-isopropyl-2-methoxy ethyl 3-propyllbenzoate, 1-isopropyl-2-methoxy ethyl 3-butylbenzoate, 1-t-butyl-2-methoxy ethyl 3-methylbenzoate, 1-t-butyl-2-methoxy ethyl 3-ethylbenzoate, 1-t-butyl-2-methoxy ethyl 3-propylbenzoate, 1-t-butyl-2-methoxy ethyl 3-butylbenzoate, 1-isobutyl-2-methoxy ethyl 3-methylbenzoate, 1-isobutyl-2-methoxy ethyl 3-ethylbenzoate, 1-isobutyl-2-methoxy ethyl 3-propylbenzoate, 1-isobutyl-2-methoxy ethyl 3-butylbenzoate, 1-n-butyl-2-methoxy ethyl 3-methylbenzoate, 1-n-butyl-2-methoxy ethyl 3-ethylbenzoate, 1-n-butyl-2-methoxy ethyl 3-propylbenzoate, 1-n-butyl-2-methoxy ethyl 3-butylbenzoate, 1-n-pentyl-2-methoxy ethyl 3-methylbenzoate, 1-n-pentyl-2-methoxy ethyl 3-ethylbenzoate, 1-n-pentyl-2-methoxy ethyl 3-propylbenzoate, 1-n-pentyl-2-methoxy ethyl 3-butylbenzoate, 1-isopentyl-2-methoxy ethyl 3-methylbenzoate, 1-isopentyl-2-methoxy ethyl 3-ethylbenzoate, 1-isopentyl-2-methoxy ethyl 3-propylbenzoate, 1-isopentyl-2-methoxy ethyl 3-butylbenzoate, 1-n-hexyl-2-methoxy ethyl 3-methylbenzoate, 1-n-hexyl-2-methoxy ethyl 3-ethylbenzoate, 1-n-hexyl-2-methoxy ethyl 3-propylbenzoate, 1-n-hexyl-2-methoxy ethyl 3-butylbenzoate, 1-isohexyl-2-methoxy ethyl 3-methylbenzoate, 1-isohexyl-2-methoxy ethyl 3-ethylbenzoate, 1-isohexyl-2-methoxy ethyl 3-propylbenzoate, 1-isohexyl-2-methoxy ethyl 3-butylbenzoate, 1-n-heptyl-2-methoxy ethyl 3-methylbenzoate, 1-n-heptyl-2-methoxy ethyl 3-ethylbenzoate, 1-n-heptyl-2-methoxy ethyl 3-propylbenzoate, 1-n-heptyl-2-methoxy ethyl 3-butylbenzoate, 1-isoheptyl-2-methoxy ethyl 3-methylbenzoate, 1-isoheptyl-2-methoxy ethyl 3-ethylbenzoate, 1-isoheptyl-2-methoxy ethyl 3-propylbenzoate, 1-isoheptyl-2-methoxy ethyl 3-butylbenzoate, 1-n-octyl-2-methoxy ethyl 3-methylbenzoate, 1-n-octyl-2-methoxy ethyl 3-ethylbenzoate, 1-n-octyl-2-methoxy ethyl 3-propylbenzoate, 1-n-octyl-2-methoxy ethyl 3-butylbenzoate, 1-isooctyl-2-methoxy ethyl 3-methylbenzoate, 1-isooctyl-2-methoxy ethyl 3-ethylbenzoate, 1-isooctyl-2-methoxy ethyl 3-propylbenzoate, 1-isooctyl-2-methoxy ethyl 3-butylbenzoate, 1-nonyl-2-methoxy ethyl 3-methylbenzoate, 1-nonyl-2-methoxy ethyl 3-ethylbenzoate, 1-nonyl-2-methoxy ethyl 3-propylbenzoate, 1-nonyl-2-methoxy ethyl 3-butylbenzoate, 1-i-nonyl-2-methoxy ethyl 3-methylbenzoate, 1-i-nonyl-2-methoxy ethyl 3-ethylbenzoate, 1-i-nonyl-2-methoxy ethyl 3-propylbenzoate, and 1-i-nonyl-2-methoxy ethyl 3-butylbenzoate.

Specific examples of the 1-alkyl-2-methoxy ethyl 4-alkylbenzoate include, but are not limited to, 1-ethyl-2-methoxy ethyl 4-methylbenzoate, 1-ethyl-2-methoxy ethyl 4-ethylbenzoate, 1-ethyl-2-methoxy ethyl 4-propylbenzoate, 1-ethyl-2-methoxy ethyl 4-butylbenzoate, 1-propyl-2-methoxy ethyl 4-methylbenzoate, 1-propyl-2-methoxy ethyl 4-ethylbenzoate, 1-propyl-2-methoxy ethyl 4-propylbenzoate, 1-propyl-2-methoxy ethyl 4-butylbenzoate, 1-isopropyl-2-methoxy ethyl 4-methylbenzoate, 1-isopropyl-2-methoxy ethyl 4-ethylbenzoate, 1-isopropyl-2-methoxy ethyl 4-propyllbenzoate, 1-isopropyl-2-methoxy ethyl 4-butylbenzoate, 1-t-butyl-2-methoxy ethyl 4-methylbenzoate, 1-t-butyl-2-methoxy ethyl 4-ethylbenzoate, 1-t-butyl-2-methoxy ethyl 4-propylbenzoate, 1-t-butyl-2-methoxy ethyl 4-butylbenzoate, 1-isobutyl-2-methoxy ethyl 4-methylbenzoate, 1-isobutyl-2-methoxy ethyl 4-ethylbenzoate, 1-isobutyl-2-methoxy ethyl 4-propylbenzoate, 1-isobutyl-2-methoxy ethyl 4-butylbenzoate, 1-n-butyl-2-methoxy ethyl 4-methylbenzoate, 1-n-butyl-2-methoxy ethyl 4-ethylbenzoate, 1-n-butyl-2-methoxy ethyl 4-propylbenzoate, 1-n-butyl-2-methoxy ethyl 4-butylbenzoate, 1-n-pentyl-2-methoxy ethyl 4-methylbenzoate, 1-n-pentyl-2-methoxy ethyl 4-ethylbenzoate, 1-n-pentyl-2-methoxy ethyl 4-propylbenzoate, 1-n-pentyl-2-methoxy ethyl 4-butylbenzoate, 1-isopentyl-2-methoxy ethyl 4-methylbenzoate, 1-isopentyl-2-methoxy ethyl 4-ethylbenzoate, 1-isopentyl-2-methoxy ethyl 4-propylbenzoate, 1-isopentyl-2-methoxy ethyl 4-butylbenzoate, 1-n-hexyl-2-methoxy ethyl 4-methylbenzoate, 1-n-hexyl-2-methoxy ethyl 4-ethylbenzoate, 1-n-hexyl-2-methoxy ethyl 4-propylbenzoate, 1-n-hexyl-2-methoxy ethyl 4-butylbenzoate, 1-isohexyl-2-methoxy ethyl 4-methylbenzoate, 1-isohexyl-2-methoxy ethyl 4-ethylbenzoate, 1-isohexyl-2-methoxy ethyl 4-propylbenzoate, 1-isohexyl-2-methoxy ethyl 4-butylbenzoate, 1-n-heptyl-2-methoxy ethyl 4-methylbenzoate, 1-n-heptyl-2-methoxy ethyl 4-ethylbenzoate, 1-n-heptyl-2-methoxy ethyl 4-propylbenzoate, 1-n-heptyl-2-methoxy ethyl 4-butylbenzoate, 1-isoheptyl-2-methoxy ethyl 4-methylbenzoate, 1-isoheptyl-2-methoxy ethyl 4-ethylbenzoate, 1-isoheptyl-2-methoxy ethyl 4-propylbenzoate, 1-isoheptyl-2-methoxy ethyl 4-butylbenzoate, 1-n-octyl-2-methoxy ethyl 4-methylbenzoate, 1-n-octyl-2-methoxy ethyl 4-ethylbenzoate, 1-n-octyl-2-methoxy ethyl 4-propylbenzoate, 1-n-octyl-2-methoxy ethyl 4-butylbenzoate, 1-isooctyl-2-methoxy ethyl 4-methylbenzoate, 1-isooctyl-2-methoxy ethyl 4-ethylbenzoate, 1-isooctyl-2-methoxy ethyl 4-propylbenzoate, 1-isooctyl-2-methoxy ethyl 4-butylbenzoate, 1-nonyl-2-methoxy ethyl 4-methylbenzoate, 1-nonyl-2-methoxy ethyl 4-ethylbenzoate, 1-nonyl-2-methoxy ethyl 4-propylbenzoate, 1-nonyl-2-methoxy ethyl 4-butylbenzoate, 1-i-nonyl-2-methoxy ethyl 4-methylbenzoate, 1-i-nonyl-2-methoxy ethyl 3-ethylbenzoate, 1-i-nonyl-2-methoxy ethyl 4-propylbenzoate, and 1-i-nonyl-2-methoxy ethyl 4-butylbenzoate.

Specific examples of the 1-alkyl-2-methoxy ethyl 3,5-dialkylbenzoate include, but are not limited to, 1-ethyl-2-methoxy ethyl 3,5-dimethylbenzoate, 1-ethyl-2-methoxy ethyl 3,5-diethylbenzoate, 1-ethyl-2-methoxy ethyl 3,5-dipropylbenzoate, 1-ethyl-2-methoxy ethyl 3,5-dibutylbenzoate, 1-propyl-2-methoxy ethyl 3,5-dimethylbenzoate, 1-propyl-2-methoxy ethyl 3,5-diethylbenzoate, 1-propyl-2-methoxy ethyl 3,5-dipropylbenzoate, 1-propyl-2-methoxy ethyl 3,5-dibutylbenzoate, 1-isopropyl-2-methoxy ethyl 3,5-dimethylbenzoate, 1-isopropyl-2-methoxy ethyl 3,5-diethylbenzoate, 1-isopropyl-2-methoxy ethyl 3,5-dipropyllbenzoate, 1-isopropyl-2-methoxy ethyl 3,5-dibutylbenzoate, 1-t-butyl-2-methoxy ethyl 3,5-dimethylbenzoate, 1-t-butyl-2-methoxy ethyl 3,5-diethylbenzoate, 1-t-butyl-2-methoxy ethyl 3,5-dipropylbenzoate, 1-t-butyl-2-methoxy ethyl 3,5-dibutylbenzoate, 1-isobutyl-2-methoxy ethyl 3,5-dimethylbenzoate, 1-isobutyl-2-methoxy ethyl 3,5-diethylbenzoate, 1-isobutyl-2-methoxy ethyl 3,5-dipropylbenzoate, 1-isobutyl-2-methoxy ethyl 3,5-dibutylbenzoate, 1-n-butyl-2-methoxy ethyl 3,5-dimethylbenzoate, 1-n-butyl-2-methoxy ethyl 3,5-diethylbenzoate, 1-n-butyl-2-methoxy ethyl 3,5-dipropylbenzoate, 1-n-butyl-2-methoxy ethyl 3,5-dibutylbenzoate, 1-n-pentyl-2-methoxy ethyl 3,5-dimethylbenzoate, 1-n-pentyl-2-methoxy ethyl 3,5-diethylbenzoate, 1-n-pentyl-2-methoxy ethyl 3,5-dipropylbenzoate, 1-n-pentyl-2-methoxy ethyl 3,5-dibutylbenzoate, 1-isopentyl-2-methoxy ethyl 3,5-dimethylbenzoate, 1-isopentyl-2-methoxy ethyl 3,5-diethylbenzoate, 1-isopentyl-2-methoxy ethyl 3,5-dipropylbenzoate, 1-isopentyl-2-methoxy ethyl 3,5-dibutylbenzoate, 1-n-hexyl-2-methoxy ethyl 3,5-dimethylbenzoate, 1-n-hexyl-2-methoxy ethyl 3,5-diethylbenzoate, 1-n-hexyl-2-methoxy ethyl 3,5-dipropylbenzoate, 1-n-hexyl-2-methoxy ethyl 3,5-dibutylbenzoate, 1-isohexyl-2-methoxy ethyl 3,5-dimethylbenzoate, 1-isohexyl-2-methoxy ethyl 3,5-diethylbenzoate, 1-isohexyl-2-methoxy ethyl 3,5-dipropylbenzoate, 1-isohexyl-2-methoxy ethyl 3,5-dibutylbenzoate, 1-n-heptyl-2-methoxy ethyl 3,5-dimethylbenzoate, 1-n-heptyl-2-methoxy ethyl 3,5-diethylbenzoate, 1-n-heptyl-2-methoxy ethyl 3,5-dipropylbenzoate, 1-n-heptyl-2-methoxy ethyl 3,5-dibutylbenzoate, 1-isoheptyl-2-methoxy ethyl 3,5-dimethylbenzoate, 1-isoheptyl-2-methoxy ethyl 3,5-diethylbenzoate, 1-isoheptyl-2-methoxy ethyl 3,5-dipropylbenzoate, 1-isoheptyl-2-methoxy ethyl 3,5-dibutylbenzoate, 1-n-octyl-2-methoxy ethyl 3,5-dimethylbenzoate, 1-n-octyl-2-methoxy ethyl 3,5-diethylbenzoate, 1-n-octyl-2-methoxy ethyl 3,5-dipropylbenzoate, 1-n-octyl-2-methoxy ethyl 3,5-dibutylbenzoate, 1-isooctyl-2-methoxy ethyl 3,5-dimethylbenzoate, 1-isooctyl-2-methoxy ethyl 3,5-diethylbenzoate, 1-isooctyl-2-methoxy ethyl 3,5-dipropylbenzoate, 1-isooctyl-2-methoxy ethyl 3,5-dibutylbenzoate, 1-nonyl-2-methoxy ethyl 3,5-dimethylbenzoate, 1-nonyl-2-methoxy ethyl 3,5-diethylbenzoate, 1-nonyl-2-methoxy ethyl 3,5-dipropylbenzoate, 1-nonyl-2-methoxy ethyl 3,5-dibutylbenzoate, 1-i-nonyl-2-methoxy ethyl 3,5-dimethylbenzoate, 1-i-nonyl-2-methoxy ethyl 3,5-diethylbenzoate, 1-i-nonyl-2-methoxy ethyl 3,5-dipropylbenzoate, and 1-i-nonyl-2-methoxy ethyl 3,5-dibutylbenzoate.

In one embodiment, the solid catalyst component comprises an internal electron donor compound containing at least one ester group and at least one alkoxy group, but does not include additional internal electron donors. In another embodiment, the solid catalyst component includes other internal electron donors in addition to the internal electron donor compound containing at least one ester group and at least one alkoxy group. For example, when preparing the solid catalyst component, other internal electron donors can be added to the preparation and/or may form the solid catalyst itself and/or other constituents in addition to the internal electron donor containing at least one ester group and at least one alkoxy group.

Examples of other internal electron donors include oxygen-containing electron donors such as organic acid esters. Specific examples include, but are not limited to, diethyl ethylmalonate, diethyl propylmalonate, diethyl isopropylmalonate, diethyl butylmalonate, diethyl 1,2-cyclohexanedicarboxylate, di-2-ethylhexyl 1,2-cyclohexanedicarboxylate, di-2-isononyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl 4-methylbenzoate, ethyl 4-methylbenzoate, amyl 4-methylbenzoate, ethyl 4-ethylbenzoate, methyl anisate, ethyl anisate, ethyl 4-ethoxybenzoate, diisononyl phthalate, di-2-ethylhexyl phthalate, diethyl succinate, dipropyl succinate, diisopropyl succinate, dibutyl succinate, diisobutyl succinate, dioctyl succinate, diisononyl succinate, and diether compounds such as 9,9-bis(methoxymethyl) fluorine, 2-isopropyl-2-isopentyl-1,3-dimethoxypropane, 2,2-diisobutyl-1,3-dimethoxypropane, 2,2-diisopentyl-1,3-dimethoxypropane, 2-isopropyl-2-cyclohexyl-1,3-dimethoxypropane.

The internal electron donor compounds may be used individually or in combination. In employing the internal electron donor compounds, they do not have to be used directly as starting materials, but compounds convertible to the electron donors in the course of preparing the solid catalyst components may also be used as the starting materials.

The solid catalyst component can be made by contacting a magnesium compound and a titanium compound with an internal electron donor compound containing at least one ester group and at least one alkoxy group.

In one embodiment, the solid catalyst component is made by contacting a magnesium compound and a titanium compound in the presence of an internal electron donor compound containing at least one ester group and at least one alkoxy group. In another embodiment, the solid catalyst component is made by forming a magnesium based support optionally with a titanium compound and optionally with an internal electron donor compound containing at least one ester group and at least one alkoxy group, and contacting the magnesium based support with the titanium compound and the internal electron donor compound containing at least one ester group and at least one alkoxy group. In yet another embodiment, the solid catalyst component is made by contacting a magnesium based support with a titanium compound to form a mixture, then contacting the mixture with an internal electron donor compound containing at least one ester group and at least one alkoxy group. In still yet another embodiment, the solid catalyst component is made by contacting a magnesium based support with a titanium compound to form a mixture, then contacting the mixture with an internal electron compound containing at least one ester group and at least one alkoxy group, then contacting the mixture again with the internal electron donor compound containing at least one ester group and at least one alkoxy group. Such repeated contact with the internal electron donor compound containing at least one ester group and at least one alkoxy group can occur once, twice, or three times successively or with other acts performed between contacts with additional doses of the internal electron donor compounds containing at least one ester group and at least one alkoxy group.

Generally, the magnesium based support is made by dissolving a magnesium compound in a solvent mixture comprising an organic epoxy compound, an organic phosphorus compound and an optional inert diluent to form a homogenous solution.

The organic epoxy compounds used in the presently disclosed and claimed inventive concept(s) include compounds having at least one epoxy group in the forms of monomers, dimmers, oligomers and polymers. Examples of epoxy compounds include, but are not limited to aliphatic epoxy compounds, alicyclic epoxy compounds, aromatic epoxy compounds, or the like. Examples of aliphatic epoxy compounds include, but are not limited to halogenated aliphatic epoxy compounds, aliphatic epoxy compounds having a keto group, aliphatic epoxy compounds having an ether bond, aliphatic epoxy compounds having an ester bond, aliphatic epoxy compounds having a tertiary amino group, aliphatic epoxy compounds having a cyano group, or the like. Examples of alicyclic epoxy compounds include, but are not limited to halogenated alicyclic epoxy compounds, alicyclic epoxy compounds having a keto group, alicyclic epoxy compounds having an ether bond, alicyclic epoxy compounds having an ester bond, alicyclic epoxy compounds having a tertiary amino group, alicyclic epoxy compounds having a cyano group, or the like. Examples of aromatic epoxy compounds include, but are not limited to halogenated aromatic epoxy compounds, aromatic epoxy compounds having a keto group, aromatic epoxy compounds having an ether bond, aromatic epoxy compounds having an ester bond, aromatic epoxy compounds having a tertiary amino group, aromatic epoxy compounds having a cyano group, or the like.

Specific examples of epoxy compounds include, but are not limited to, epifluorohydrin, epichlorohydrin, epibromohydrin, hexafluoropropylene oxide, 1,2-epoxy-4-fluorobutane, 1-(2,3-epoxypropyl)-4-fluorobenzene, 1-(3,5-epoxybutyl)-2-fluorobenzene, 1-(2,3-epoxypropyl)-4-chlorobenzene, 1-(3,5-epoxybutyl)-3-chlorobenzene, or the like. Specific examples of halogenated alicyclic epoxy compounds include 4-fluoro-1,2-cyclohexene oxide, 6-chloro-2,3 epoxybicyclo[2,2,1]heptane, or the like. Specific examples of halogenated aromatic epoxy compounds include 4-fluorostyrene oxide, 1-(1,2-epoxypropyl)-3-trifluorobenzene, or the like.

The organic phosphorus compounds used in the presently disclosed and claimed inventive concept(s) include, but are not limited, to hydrocarbyl esters and halohydrocarbyl esters of ortho-phosphoric acid and phosphorous acid. Specific examples include, but are not limited to trimethyl phosphate, triethyl phosphate, tributyl phosphate, triphenyl phosphate, trimethyl phosphite, triethyl phosphite, tributyl phosphite and triphenyl phosphite.

In order to improve the ability of the magnesium compound to be dissolved, an inert diluent may be optionally added to the solvent mixture. The inert diluent can typically be aromatic hydrocarbons or alkanes, as long as it is capable of facilitating the dissolution of the magnesium compound. Examples of aromatic hydrocarbons include, but are not limited to benzene, toluene, xylene, chlorobenzene, dichlorobenzene, trichlorobenzene, chlorotoluene, and derivatives thereof. Examples of alkanes include linear, branched, or cyclic alkanes having about 3 to about 30 carbons, such as butane, pentane, hexane, cyclohexane, heptanes, and the like. These inert diluents may be used alone or in combination.

In embodiments of preparing the solid catalyst component according to the Examples, the magnesium based support is mixed with a titanium compound such as liquid titanium tetrahalide to form a solid precipitate in the optional presence of an auxiliary precipitant. The auxiliary precipitant may be added before, during or after the precipitation of the solids and loaded on the solids.

The auxiliary precipitants used in the presently disclosed and claimed inventive concept(s) include carboxylic acids, carboxylic acid anhydrides, ethers, ketones, or mixture thereof. Specific examples include, but are not limited to, acetic anhydride, phthalic anhydride, succinic anhydride, maleic anhydride, 1,2,4,5-benzene tetracarboxylic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, and dipentyl ether.

Solid precipitation can be carried out by one or more processes selected from the following. One method involves mixing a titanium compound such as liquid titanium tetrahalide with a magnesium based support at a temperature in the range of about −40 degree Celsius to about 0 degree Celsius, and precipitating the solids while the temperature is raised slowly to a range from about 30 degrees Celsius to about 120 degrees Celsius, for example from about 60 degrees Celsius to about 100 degrees Celsius but not by way of limitation. The second method involves adding a titanium compound dropwise into a magnesium based support to precipitate out solids immediately. The third method involves adding a first titanium compound dropwise into a magnesium based support and mixing a second titanium compound with the magnesium based support. In these methods, an internal electron donor compound containing at least one ester group and at least one alkoxy group can be present in the reaction system. The internal electron donor compound containing at least one ester group and at least one alkoxy group can be added either after the magnesium based support is obtained or after the solid precipitate is formed.

In one embodiment, when the solid catalyst component is formed, a surfactant can be used so as to produce a relatively large size and substantially spherical shape of the magnesium based support, thereby contributing to many of the beneficial properties of the solid catalyst component and catalyst system. General examples of surfactants include polymer surfactants, such as polyacrylates, polymethacrylates, polyalkyl methacrylates, and the like. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

In one embodiment, non-ionic surfactants and/or anionic surfactants can be used. Examples of non-ionic surfactants and/or anionic surfactants include, but are not limited to, phosphate esters, alkyl sulfonates, aryl sulfonates, alkylaryl sulfonates, linear alkyl benzene sulfonates, alkylphenols, ethoxylated alcohols, carboxylic esters, fatty alcohols, fatty esters, fatty aldehydes, fatty ketones, fatty acid nitriles, benzene, naphthalene, anthracene, succinic anhydride, phthalic anhydrides, rosin, terpene, phenol, or the like. In fact, a number of anhydride surfactants are effective. In some instances, the absence of an anhydride surfactant causes the formation of very small catalyst support particles while the over-use creates straw shaped material sometimes referred to as needles.

The solid catalyst precursor can be formed in one embodiment, as follows. In a solvent such as toluene, a magnesium and titanium containing solution is seen following the addition of a halogenating agent such as $TiCl_4$ into a magnesium based solution at relatively cooler temperatures, such as −25 degrees Celsius until about 0 degrees Celsius. An oil phase is then formed, which can be dispersed into the hydrocarbon phase that is stable until about 40 degrees Celsius. The resultant magnesium material becomes a semi-solid at this point and the particle morphology is thereafter determined. The semi-solid product converts into a solid between about 40 degrees Celsius and about 80 degrees Celsius.

In order to facilitate obtaining uniform solid particles, the process of precipitation can be carried out slowly. When the second method of adding titanium halide dropwise at low or room temperature is applied, the process may take place over a period from about 1 hour to about 6 hours. When the first method of raising the temperature in a slow manner is applied as described hereinafter, the rate of temperature increase can range from about 4 degrees Celsius to about 125 degrees Celsius per hour.

The solid precipitate is first separated from the mixture. Entrained in the solid precipitate may be a variety of complexes and byproducts, so that further treatment may in some instances be necessary as would be well appreciated and understood by one of ordinary skill in the art. In one embodiment, the solid precipitate is treated with a titanium compound in order to substantially remove the byproducts from the solid precipitate.

The solid precipitate can be washed with an inert diluent and then treated with a titanium compound or a mixture of a titanium compound and an inert diluent. The titanium compound used in this treatment can be identical to or different than the titanium compound used for forming the solid precipitate. The amount of titanium compound used is from about 1 to about 20 moles, such as from about 2 to about 15 moles, per mole of magnesium compound in the support. The treatment temperature ranges from about 50 degrees Celsius to about 150 degrees Celsius, such as from about 60 degrees Celsius to about 100 degrees Celsius. If a mixture of titanium tetrahalide and an inert diluent is used to treat the solid precipitate, the volume % of titanium tetrahalide in the treating solution is from about 10% to about 100%, the rest being the inert diluent.

The treated solids can be further washed with an inert diluent to remove ineffective titanium compounds and other byproducts. The inert diluent herein used can be hexane, heptanes, octane, 1,2-dichloroethane, benzene, toluene, ethylbenzene, xylene, and other hydrocarbons.

By treating the solid precipitate with the titanium compound and optionally an inert diluent, the byproducts in the solid precipitate can be removed from the solid precipitate. In one embodiment, the solid precipitate is treated with the titanium compound and optionally an inert diluent about two times or more and five times or less.

By treating the solid precipitate with an inert diluent, a free titanium compound in the solid precipitate can be removed from the solid precipitate. The resultant solid precipitate does not, in such circumstances, substantially contain a free titanium compound. In one embodiment, the solid precipitate is treated repeatedly with an inert diluent until the filtrate contains about 100 ppm or less of titanium.

In another embodiment, the solid precipitate is treated repeatedly with an inert diluent until the filtrate contains about 50 ppm or less of titanium. In yet another embodiment, the solid precipitate is treated with an inert diluent until the filtrate contains about 10 ppm or less of titanium. In one embodiment, the solid precipitate is treated with an inert diluent about three times or more and seven times or less. In all cases, one of ordinary skill in the art, given the present disclosure, would be able to vary these parameters and steps in order to tailor the presently disclosed and claimed inventive concept(s) to specific conditions and/or properties as described.

In one embodiment, the solid catalyst component contains from about 0.5 to about 6.0 wt % titanium; from about 10 to about 25 wt % magnesium; from about 40 to about 70 wt % halogen; from about 1 to about 50 wt % the internal electron donor compound containing at least one ester group and at least one alkoxy group; and optionally inert diluent from about 0 to about 15 wt %. In another embodiment, the solid catalyst component contains from about 2 to about 25 wt % of one or more of the internal electron donors containing at least one ester group and at least one alkoxy group. In yet another embodiment, the solid catalyst component contains from about 5 to about 20 wt % of one or more of the internal electron donors containing at least one ester group and at least one alkoxy group.

The amounts of the ingredients used in preparing the solid catalyst component may vary depending upon the method of preparation. In one embodiment, from about 0.01 to about 5 moles of the internal electron donor compounds containing at least one ester group and at least one alkoxy group and from about 0.01 to about 500 moles of the titanium compounds are used per mole of the magnesium compound used to make the solid catalyst component. In another embodiment, from about 0.05 to about 2 moles of the internal electron donor compounds containing at least one ester group and at least one alkoxy group and from about 0.05 to about 300 moles of the titanium compounds are used per mole of the magnesium compound used to make the solid catalyst component.

In one embodiment, in the solid catalyst component, the atomic ratio of halogen/titanium is from about 4 to about 200; the internal electron donor/titanium mole ratio is from about 0.01 to about 10; and the magnesium/titanium atomic ratio is from about 1 to about 100. In another embodiment, in the solid catalyst component, the atomic ratio of halogen/titanium is from about 5 to about 100; the internal electron donor/titanium mole ratio is from about 0.2 to about 6; and the magnesium/titanium atomic ratio is from about 2 to about 50.

The resulting solid catalyst component generally contains a magnesium halide of a smaller crystal size than traditional and/or commercially available magnesium halides and usually has a specific surface area of at least about 5 m²/g, such as from about 10 to about 1,000 m²/g, or from about 100 to about 800 m²/g. Since the above ingredients are unified to form an integral structure of the solid catalyst component, the composition of the solid catalyst component does not substantially change by washing with, for example, hexane.

The solid catalyst component may be used after being diluted with an inorganic or organic compound such as a silicon compound, an aluminum compound, or the like. One of ordinary skill in the art would appreciate that while such dilution may be desirable in certain situations it is not necessary for all applications.

Methods of preparing solid catalyst components, which can be used in the presently disclosed and claimed inventive concept(s), are described in U.S. Patents and U.S. Pat. Nos. 4,771,023; 4,784,983; 4,829,038; 4,861,847; 4,990,479; 5,177,043; 5,194,531; 5,244,989; 5,438,110; 5,489,634; 5,576,259; 5,767,215; 5,773,537; 5,905,050; 6,323,152; 6,437,061; 6,469,112; 6,962,889; 7,135,531; 7,153,803; 7,271,119; 2004242406; 20040242407; and 20070021573 which are hereby incorporated by reference in their entirety as those set forth explicitly therein in this regard.

The catalyst system may contain at least one organoaluminum compound in addition to the solid catalyst component. Compounds having at least one aluminum-carbon bond in the molecule can be used as the organoaluminum compound. Examples of organoaluminum compounds include compounds of the following chemical formula (IV):

$$AlR_nX_{3-n} \qquad (IV)$$

In formula (IV), R independently represents a hydrocarbon group usually having 1 to about 20 carbon atoms, X represents a halogen atoms, and $0<n\leq 3$.

Specific examples of the organoaluminum compounds represented by formula (IV) include, but are not limited to, trialkyl aluminums such as triethyl aluminum, tributyl aluminum and trihexyl aluminum; trialkenyl aluminums such as triisoprenyl aluminum; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; and other partially hydrogenated alkyl aluminum such as ethyl aluminum dihydride and propyl aluminum dihydride.

The organoaluminum compound is used in such catalyst system of the presently disclosed and claimed inventive concept(s) in an amount that the mole ratio of aluminum to titanium (from the solid catalyst component) is from about 5 to about 1,000. In another embodiment, the mole ratio of aluminum to titanium in the catalyst system is from about 10 to about 700. In yet another embodiment, the mole ratio of aluminum to titanium in the catalyst system is from about 25 to about 400.

The catalyst system may contain at least one organosilicon compound in addition to the solid catalyst component. This organosilicon compound may, although not always, be referred as an external electron donor. The organosilicon compound contains silicon having at least one hydrogen ligand (hydrocarbon group). General examples of hydrocarbon groups include alkyl groups, cycloalkyl groups, (cycloalkyl)methylene groups, alkene groups, aromatic groups, and the like.

The organosilicon compound, when used as an external electron donor serving as one component of a Ziegler-Natta catalyst system for olefin polymerization, improves the ability of the catalyst system to produce a polymer (at least a portion of which is polyolefin) having a controllable crystallinity while retaining high performance with respect to catalytic activity.

The organosilicon compound is used in the catalyst system in an amount that the mole ratio of the organoaluminum compound to the organosilicon compound is from about 2 to about 90. In another embodiment, the mole ratio of the organoaluminum compound to the organosilicon compound is from about 5 to about 70. In yet another embodiment, the mole ration of the organoaluminum compound to the organosilicon compound is from about 7 to about 35.

In one embodiment, the organosilicon compound is represented by chemical formula (V):

$$R_nSi(OR')_{4-n} \quad (V)$$

wherein each R and R' independently represent a hydrocarbon group, and n is 0≤n<4.

Specific examples of the organosilicon compound of formula (V) include, but are not limited to, trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-amniopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, and methyltriallyloxysilane.

In another embodiment, the organosilicon compound is represented by chemical formula (VI):

$$SiRR'_m(OR'')_{3-m} \quad (VI)$$

In the above formula (VI), 0≤m<3, such as 0≤m≤2; and R independently represents a cyclic hydrocarbon or substituted cyclic hydrocarbon group. Specific examples of the group R include, but are not limited to, cyclopropyl; cyclobutyl; cyclopentyl; 2-methylcyclopentyl; 3-methylcyclopentyl; 2-ethylcyclopentyl; 3-propylcyclopentyl; 3-isopropylcyclopentyl; 3-butylcyclopentyl; 3-tetiary butyl cyclopentyl; 2,2-dimethylcyclopentyl; 2,3-dimethylcyclopentyl; 2,5-dimethylcyclopentyl; 2,2,5-trimethylcyclopentyl; 2,3,4,5-tetramethylcyclopentyl; 2,2,5,5-tetramethylcyclopentyl; 1-cyclopentylpropyl; 1-methyl-1-cyclopentylethyl; cyclopentenyl; 2-cyclopentenyl; 3-cyclopentenyl; 2-methyl-1-cyclopentenyl; 2-methyl-3-cyclopentenyl; 3-methyl-3-cyclopentenyl; 2-ethyl-3-cyclopentenyl; 2,2-dimethyl-3-cyclopentenyl; 2,5-dimethyl-3-cyclopentenyl; 2,3,4,5-tetramethyl-3-cyclopentenyl; 2,2,5,5-tetramethyl-3-cyclopentenyl; 1,3-cyclopentadienyl; 2,4-cyclopentadienyl; 1,4-cyclopentadienyl; 2-methyl-1,3-cyclopentadienyl; 2-methyl-2,4-cyclopentadienyl; 3-methyl-2,4-cyclopentadienyl; 2-ethyl-2,4-cyclopentadienyl; 2,2-dimethyl-2,4-cyclopentadienyl; 2,3-dimethyl-2,4-cyclopentadienyl; 2,5-dimethyl-2,4-cyclopentadienyl; 2,3,4,5-tetramethyl-2,4-cyclopentadienyl; indenyl; 2-methylindenyl; 2-ethylindenyl; 2-indenyl; 1-methyl-2-indenyl; 1,3-dimethyl-2-indenyl; indanyl; 2-methylindanyl; 2-indanyl; 1,3-dimethyl-2-indanyl; 4,5,6,7-tetrahydroindenyl; 4,5,6,7-tetrahydro-2-indenyl; 4,5,6,7-tetrahydro-1-methyl-2-indenyl; 4,5,6,7-tetrahydro-1,3-dimethyl-2-indenyl; fluorenyl groups; cyclohexyl; methylcyclohexyls; ethylcylcohexyls; propylcyclohexyls; isopropylcyclohexyls; n-butylcyclohexyls; tertiary-butyl cyclohexyls; dimethylcyclohexyls; and trimethylcyclohexyls.

In formula (VI), R' and R" are identical or different and each represents a hydrocarbons. Examples of R' and R" are alkyl, cycloalkyl, aryl and aralkyl groups having 3 or more carbon atoms. Furthermore, R and R' may be bridged by an alkyl group, etc. General examples of organosilicon compounds are those of formula (VI) in which R is cyclopentyl group, R' is an alkyl group such as methyl or cyclopentyl group, and R" is an alkyl group, particularly a methyl or ethyl group.

Specific examples of organosilicon compound of formula (VI) include, but are not limited to, trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl)dimethoxysilane, bis(3-tertiary butylcyclopentyl)dimethoxysilane, bis(2,3-dimethylcyclopentyl) dimethoxysilane, bis(2,5-dimethylcyclopentyl) dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane and diindenylcyclopentylmethoxysilane; and ethylenebis-cyclopentyldimethoxysilane.

Polymerization of olefins in accordance with the presently disclosed and claimed inventive concept(s) is carried out in the presence of the catalyst system described above. Generally, olefins are contacted with the catalyst system described above under suitable conditions to form desired polymer products. In one embodiment, preliminary polymerization described below is carried out before main polymerization. In another embodiment, polymerization is carried out without preliminary polymerization. In yet another embodiment, the formation of copolymer is carried out using at least two polymerization zones.

In preliminary polymerization, the solid catalyst component is usually employed in combination with at least a portion of the organoaluminum compound. This process may be carried partially or completely in the presence of the organosilicon compound (i.e. the external electron donor compound). The concentration of the catalyst system used in the preliminary polymerization reactor may be much higher than that in the reaction system of the main polymerization.

The concentration of the solid catalyst component in the preliminary polymerization reactor is usually from about 0.01 to about 200 millimoles, preferably from about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and polymerizing the olefin under controllable conditions.

Specific examples of the inert hydrocarbon medium include, but are not limited to, aliphatic hydrocarbons such as propane, butane, pentane, hexane, heptanes, octane, decane, dodecane and kerosene; alicyclic hydrocarbons such as cyclopentane, cyclohexane and methylcyclopentane; and aromatic hydrocarbons such as benzene, toluene and xylene; and mixtures thereof. In the presently disclosed and claimed inventive concept(s), a liquid olefin may be used partially or completely as the inert hydrocarbon medium.

The reaction temperature for the preliminary polymerization is sufficient for the resulting preliminary polymer to be substantially insoluble in the inert hydrocarbon medium. In one embodiment, the temperature is from about −20 degrees Celsius to about 100 degrees Celsius. In another embodiment, the temperature is from about −10 degrees Celsius to about 80 degrees Celsius. In yet another embodiment, the temperature is from about 0 degrees Celsius to about 40 degrees Celsius.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decalin at 135 degrees Celsius, of at least about 0.2 dl/g, and preferably from about 0.5 to 10 dl/g.

In one embodiment, the preliminary polymerization is desirably carried out so that from about 0.1 g to about 1,000 g of a polymer is formed per gram of the solid catalyst component of the catalyst system. In another embodiment, the preliminary polymerization is desirably carried out so that from about 0.3 g to about 500 g of a polymer is formed per gram of the solid catalyst component. If the amount of the polymer formed by the preliminary polymerization is too large, the efficiency of producing the olefin polymer in the main polymerization may sometimes decrease, and when the resulting olefin polymer is molded into a film or another article, "fish eyes" (i.e. granular dots or small circles in a molded article of otherwise uniform and constant transparency) tend to occur in the molded article. The preliminary polymerization may be carried out batchwise or continuously.

After the preliminary polymerization is conducted as outlined above, or alternatively, without performing the preliminary polymerization, the main polymerization of an olefin feedstock is carried out in the presence of the above-described olefin polymerization catalyst system, i.e. the catalyst system is formed from the solid catalyst component, the organoaluminum compound and the organosilicon compound (the external electron donor compound).

Examples of olefins that can be used in the main polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In the process of the presently disclosed and claimed inventive concept(s), these alpha-olefins may be used individually or in any combinations as will be apparent to one of ordinary skill in the art given the present disclosure.

In one embodiment, propylene or 1-butene is homopolymerized, or, alternatively, a mixed olefin containing propylene or 1-butene as a main component is copolymerized. When a mixed olefin is selected or used, the proportion of propylene or 1-butene as the main component is usually at least about 50 mole %, preferably at least about 70 mole %.

By performing the preliminary polymerization, the catalyst system thereafter utilized in the main polymerization can be adjusted to select different degrees of activity. This adjustment tends to result in a powdery polymer having a high bulk density. Furthermore, when the preliminary polymerization is carried out, the particles shape of the resulting polymer becomes spherical. In the case of slurry polymerization, the slurry attains excellent characteristics, while in the case of gas phase polymerization, the polymer seed bed attains excellent characteristics. Each type of polymerization is preceded by the preliminary polymerization as described herein. Furthermore, in these embodiments, a polymer having a high stereoregularity index can be produced with a high catalytic efficiency by polymerizing an alpha-olefin having at least 3 carbon atoms. Accordingly, when producing the propylene copolymer, the resulting copolymer powder or the copolymer becomes easy to process.

In the homopolymerization of these olefins, a polyunsaturated compound such as conjugated diene or non-conjugated diene may be used as a comonomer. Examples of comonomers include styrene, butadiene, acrylonitrile, acrylamide, alpha-methyl styrene, chlorostyrene, vinyl toluene, divinyl benzene, diallyphthalate, alkyl methacrylates and alkyl acrylates. In one embodiment, the comonomers include thermoplastic and elastomeric monomers.

The main polymerization of an olefin is typically carried out in the gaseous or liquid phase. In one embodiment, the main polymerization employs a catalyst system containing the solid catalyst component in an amount from about 0.001 to about 0.75 millimoles calculated as Ti atom per liter of the volume of the polymerization zone, the organoaluminum compound in an amount from about 1 to about 2,000 moles per mole of titanium atoms in the solid catalyst component, and the organosilicon compound in an amount from about 0.001 to about 10 moles calculated as Si atoms in the organosilicon compound per mole of the metal atoms in the organoaluminum compound.

In another embodiment, the main polymerization employs a catalyst system containing the solid catalyst component in an amount of from 0.005 to about 0.5 milimoles calculated as Ti atom per liter of the volume of the polymerization zone, the organoaluminum compound in an amount from about 5 to about 500 moles per mole of titanium atoms in the solid catalyst component, and the organosilicon compound in an amount from about 0.01 to about 2 moles calculated as Si atoms in the organosilicon compound per mole of the metal atoms in the organoaluminum compound. In yet another embodiment, the main polymerization employs a catalyst system containing the alkyl benzoate derivative in an amount from about 0.005 to about 1 mole calculated as Si atoms in the organosilicon compound per mole of the metal atoms in the organoaluminum compound.

When the organoaluminum compound and the organosilicon compound are used partially in the preliminary polymerization, the catalyst system subjected to the preliminary polymerization is used together with the remainder of the catalyst system components. The catalyst system subjected to the preliminary polymerization may contain the product of the preliminary polymerization.

The use of hydrogen at the time of polymerization promotes and contributes to control of the molecular weight of the resulting polymer, and the polymer obtained may have a desirable melt flow rate. The stereoregularity index of the resulting polymer and the activity of the catalyst system are thereby increased when the methods and systems of the presently disclosed and claimed inventive concept(s) are utilized.

In one embodiment, the polymerization temperature in the main polymerization is from about 20 degree Celsius to about 200 degrees Celsius. In another embodiment, the polymerization temperature in the main polymerization is from about 50 degree Celsius to about 180 degrees Celsius. In one embodiment, the polymerization pressure in the main polymerization is typically from atmospheric pressure to about 100 kg/cm$^2$. In another embodiment, the polymerization pressure in the main polymerization is typically from about 2 kg/cm$^2$ to about 50 kg/cm$^2$. The main polymerization may be carried out batchwise, semi-continuously or continuously. The main polymerization may also be carried out in two or more stages under different reaction conditions.

The olefin polymer so obtained may be a homopolymer, a random copolymer, a block copolymer or an impact copolymer. The impact copolymer contains an intimate mixture of a polyolefin homopolymer and a polyolefin rubber. Examples of polyolefin rubbers include ethylene propylene rubber (EPR) such as ethylene propylene methylene copolymer rubber (EPM) and ethylene propylene diene methylene terpolymer rubber (EPDM).

The olefin polymer obtained by using the catalyst system has a very small amount of an amorphous polymer component and therefore a small amount of a hydrocarbon-soluble component. Accordingly, a film molded from the resultant polymer has low surface tackiness.

The polyolefin obtained by the polymerization process is excellent in particle size distribution, particle diameter and bulk density, and the copolyolefin obtained has a narrow composition distribution. In an impact copolymer, excellent fluidity, low temperature resistance, and a desired balance between stiffness and elasticity can be obtained.

In one embodiment, propylene and an alpha-olefin having 2 or from about 4 to about 20 carbon atoms are copolymerized in the presence of the catalyst system described above. The catalyst system may be one subjected to the preliminary polymerization described above. In another embodiment, propylene and an ethylene rubber are formed in two reactors coupled in series to form an impact polymer.

The alpha-olefin having 2 carbon atoms is ethylene, and examples of the alpha-olefin having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be copolymerized with two or more such alpha-olefins. For example, it is possible to copolymerize propylene with ethylene and 1-butene. In one embodiment, propylene is copolymerized with ethylene, 1-butene or ethylene and 1-butene.

Block copolymerization of propylene and another alpha-olefin may be carried out in two stages. The polymerization in a first stage may be the homopolymerization of propylene or the copolymerization of propylene with the other alpha-olefin. In one embodiment, the amount of the monomers polymerized in the first stage is from about 50 to about 95% by weight. In another embodiment, the amount of the monomers polymerized in the first stage is from about 60 to about 90% by weight. In the presently disclosed and claimed inventive concept(s), this first stage polymerization may, as required be carried out in two or more stages under the same or different polymerization conditions.

In one embodiment, the polymerization in a second stage is desirably carried out such that the mole ratio of propylene to the other alpha-olefin(s) is from about 10/90 to about 90/10. In another embodiment, the polymerization in a second stage is desirably carried out such that the mole ratio of propylene to the other alpha-olefin(s) is from about 20/80 to about 80/20. In yet another embodiment, the polymerization in a second stage is desirably carried out such that the mole ratio of propylene to the other alpha-olefin(s) is from about 30/70 to about 70/30. Producing a crystalline polymer or copolymer of another alpha-olefin may be provided in the second polymerization stage.

The propylene copolymer so obtained may be a random copolymer or the above-described block copolymer. This propylene copolymer typically contains from about 7 to about 50 mole % of units derived from the alpha-olefin having 2 or from about 4 to about 20 carbon atoms. In one embodiment, a propylene random copolymer contains from about 7 to about 20 mole % of units derived from the alpha-olefin having 2 or from about 4 to about 20 carbon atoms. In another embodiment, the propylene block copolymer contains from about 10 to about 50 mole % of units derived from the alpha-olefin having 2 or 4-20 carbon atoms.

In another embodiment, copolymers made with the catalyst system contain from about 50% to about 99% by weight poly-alpha-olefins and from about 1% to about 50% by weight comonomers (such as thermoplastic or elastomeric monomers). In another embodiment, copolymers made with the catalyst system contain from about 75% to about 98% by weight poly-alpha-olefins and from about 2% to about 25% by weight comonomers.

It should be understood that where there is no reference to a particular polyunsaturated compound, the method of polymerization, the amount of the catalyst system and the polymerization conditions, the same description as any of the above embodiments are applicable and would be apparent for one of ordinary skill in the art.

The catalysts/methods of the presently disclosed and claimed inventive concept(s) can, in some embodiments, produce poly-alpha-olefins having xylene soluble (XS) from about 0.5% to about 10%. In another embodiment, poly-alpha-olefins having xylene soluble (XS) from about 1.5% to about 8% are produced in accordance with the presently disclosed and claimed inventive concept(s). XS refers to the percent of solid polymer that dissolves into xylene. A low XS % value generally corresponds to a highly isotactic polymer (i.e. higher crystallinity), whereas a high XS % value generally corresponds to a low isotactic polymer.

In one embodiment, the catalyst efficiency (measured as kilogram of polymer produced per gram of catalyst) of the catalyst system of the presently disclosed and claimed inventive concept(s) is at least about 20. In another embodiment, the catalyst efficiency of the catalyst system of the presently disclosed and claimed inventive concept(s) is at least about 40.

The catalysts/methods of the presently disclosed and claimed inventive concept(s) can in some instances lead to the production of poly-alpha-olefins having melt flow indexes (MFI) from about 0.1 to about 100. The MFI is measured according to ASTM standard D1238. In another embodiment, poly-alpha-olefins having an MFI from about 5 to about 30 are produced in accordance with the presently disclosed and claimed inventive concept(s). In one embodiment, an impact polypropylene-ethylenepropylene rubber product has an MFI from about 4 to about 10. In another embodiment, an impact polypropylene-ethylenepropylene rubber product has an MFI from about 5 to about 9. In some instances a relatively high MFI indicates relatively high catalyst efficiency is obtainable.

The catalysts/methods of the presently disclosed and claimed inventive concept(s) can in some instances lead to the production of poly-alpha-olefins having bulk densities (BD) of at least about 0.3 cc/g. In another embodiment, poly-alpha-olefins having a BD of at least about 0.4 cc/g are produced in accordance with the presently disclosed and claimed inventive concept(s).

In one embodiment, an impact polypropylene-ethylenepropylene rubber product having a BD of at least about 0.3 cc/g is produced in accordance with the presently disclosed and claimed inventive concept(s). In another embodiment, an impact polypropylene-ethylenepropylene rubber product having a BD of at least about 0.4 cc/g is produced in accordance with the presently disclosed and claimed inventive concept(s).

The catalysts/methods of the presently disclosed and claimed inventive concept(s) lead to the production of poly-alpha-olefins having a relatively narrow molecular weight distribution. Polydispersive Index (PI) is strictly connected with the molecular weight distribution of the polymer. PI is calculated as the weight average molecular weight divided by the number average molecular weight, $PI=M_w/M_n$. In one embodiment, the PI of a polypropylene polymer made with the catalyst system is from about 2 to about 8. In another embodiment, the PI of a polypropylene polymer made with the catalyst system is from about 3 to about 5.

The presently disclosed and claimed inventive concept(s) can lead to the production of a propylene block copolymer and impact copolymers including polypropylene based impact copolymer having one or more excellent melt-flowability, moldability desirable balance between rigidity and elasticity, good stereospecific control, good control over polymer particle size, shape, size distribution, and molecular weight distribution, and impact strength with a high catalytic efficiency and/or good operability. Employing the catalyst systems containing the solid catalyst component according to the presently disclosed and claimed inventive concept(s) yields catalysts simultaneously having high catalytic efficiency, and one or more of excellent melt-flowability, extrudability, moldability, rigidity-elasticity and impact strength.

Figure 1:
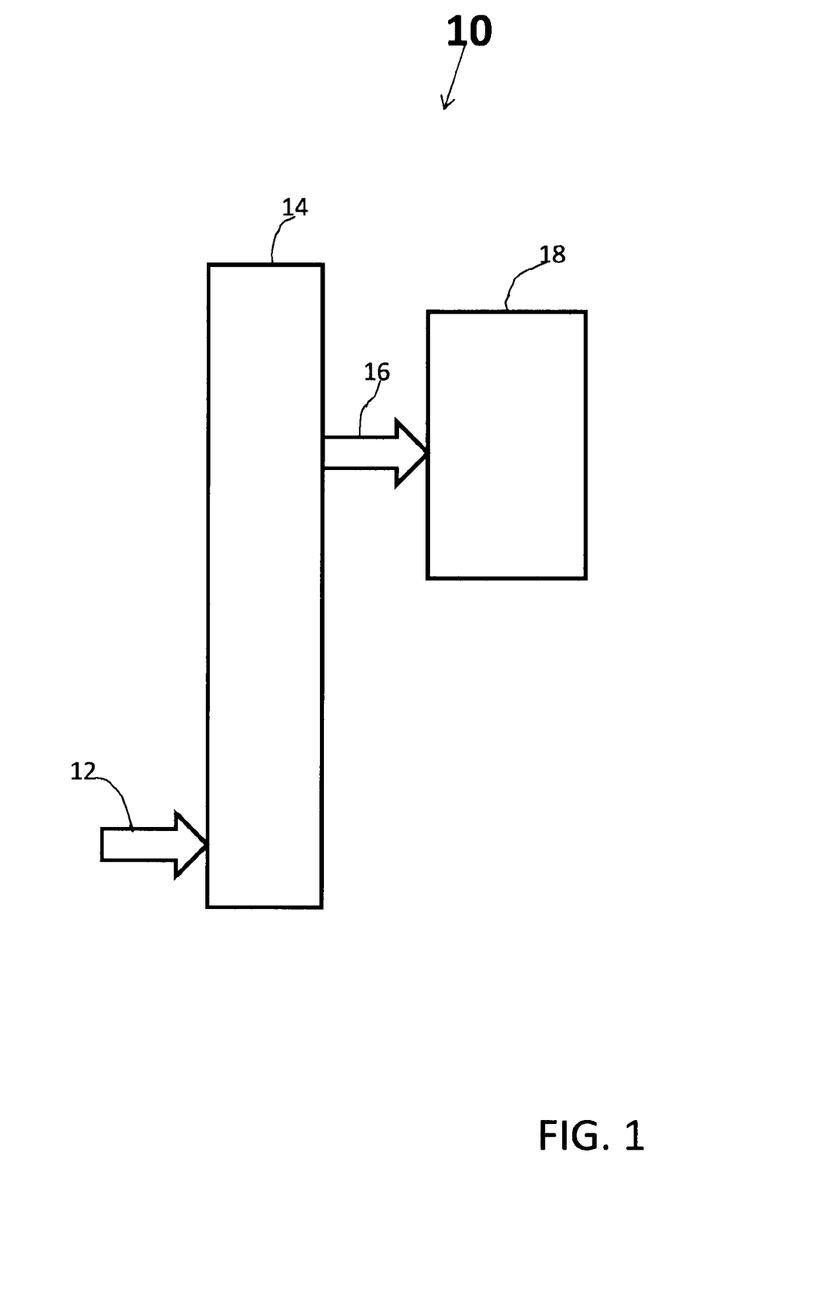
FIG. 1 is a schematic diagram of an olefin polymerization system in accordance with one aspect of the presently disclosed and claimed inventive concept(s).

Examples of systems for polymerizing olefins are now described. Referring to FIG. 1, a high level schematic diagram of a system 10 for polymerizing olefins is shown. Inlet 12 is used to introduce into a reactor 14 catalyst system components, olefins, optional comonomers, hydrogen gas, fluid media, pH adjusters, surfactants, and any other additives. Although only one inlet is shown, many often are employed. Reactor 14 is any suitable vehicle that can polymerize olefins. Examples of reactor 14 include a single reactor, a series of two or more reactors, slurry reactors, fixed bed reactors, gas phase reactors, fluidized gas reactors, loop reactors, multizone circulating reactors, and the like. Once polymerization is complete, or as polyolefins are produced, the polymer product is removed from the reactor 14 via outlet 16 which leads to a collector 18. Collector 18 may include downstream processing, such as heating, extrusion, molding, and the like.

Figure 2:
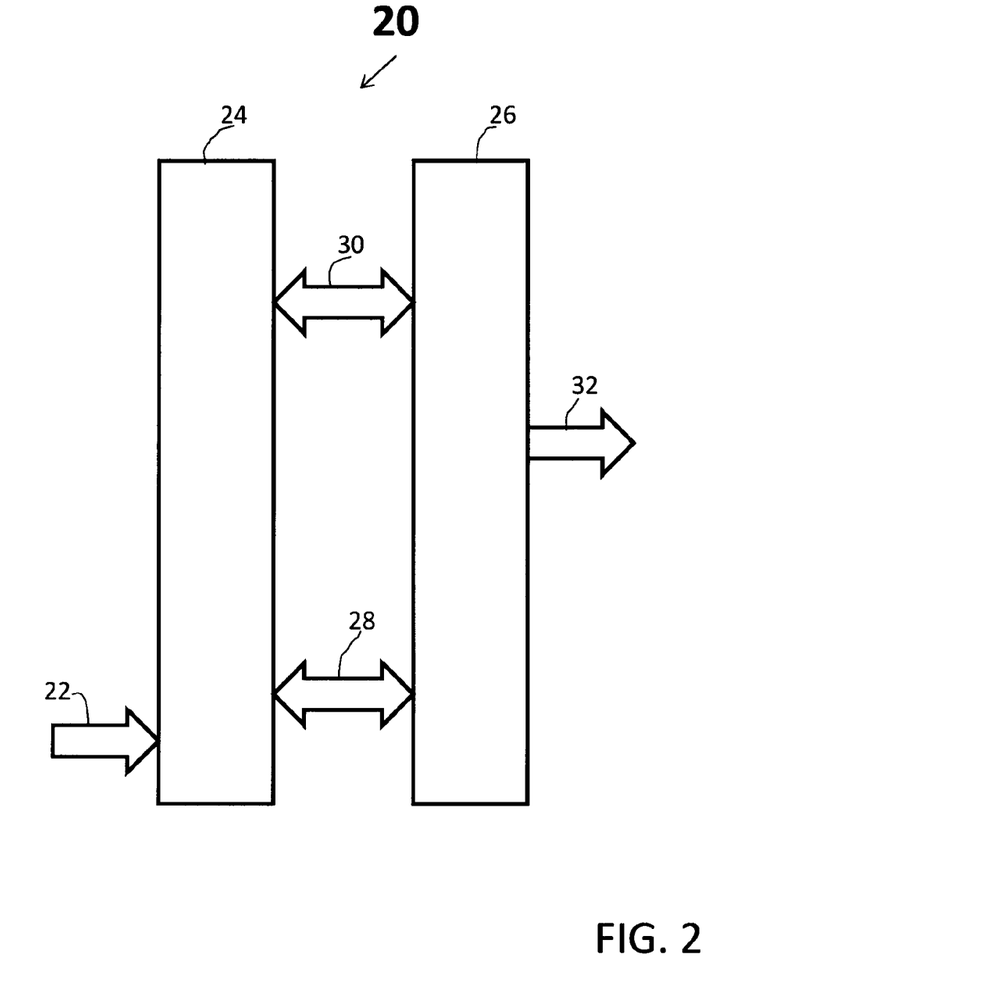
FIG. 2 is a schematic diagram of an olefin polymerization reactor in accordance with one aspect of the presently disclosed and claimed inventive concept(s).
Figure 3:
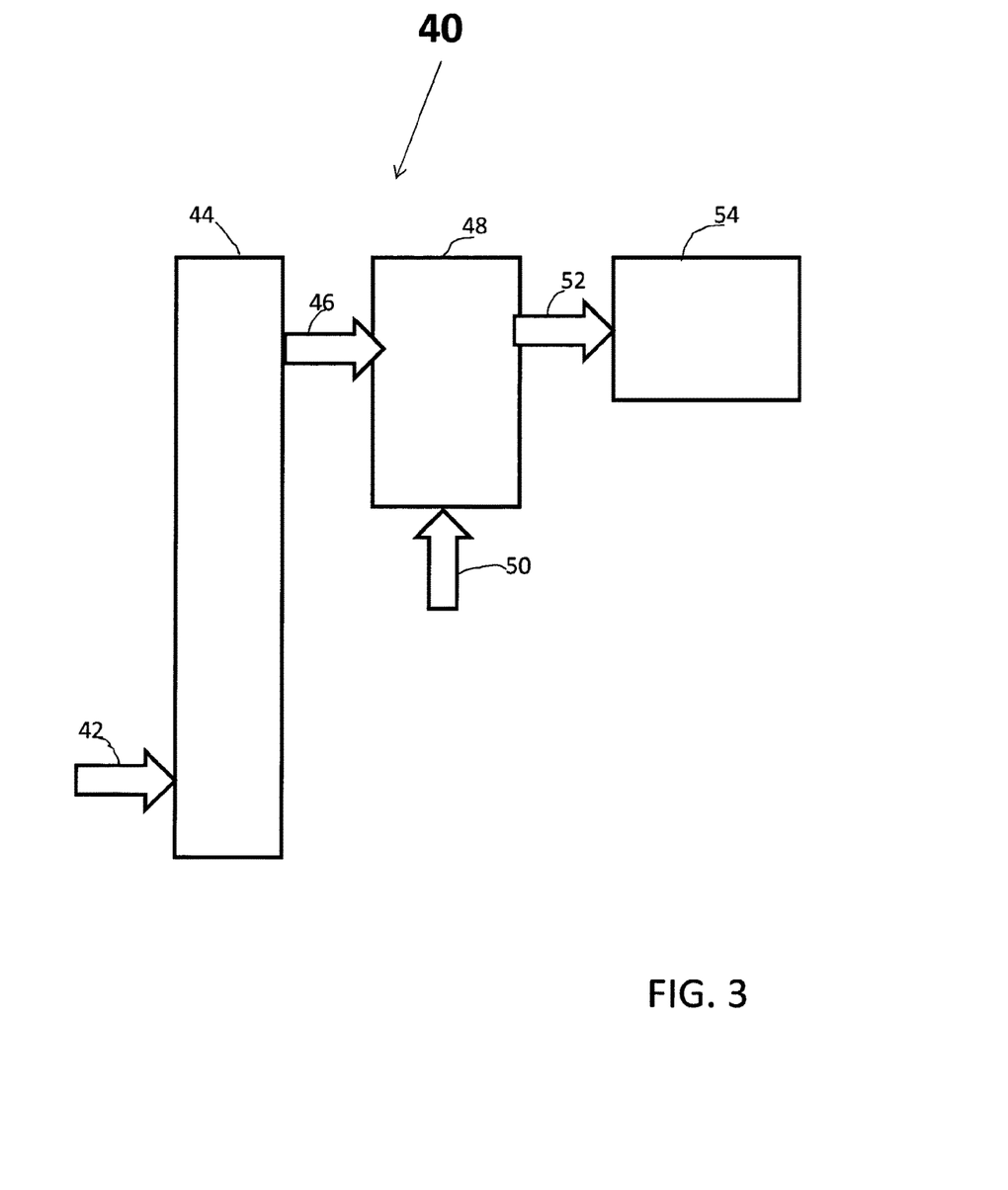
FIG. 3 is a schematic diagram of a system for making impact copolymer in accordance with one aspect of the presently disclosed and claimed inventive concept(s).

Referring to FIG. 2, a schematic diagram of a multizone circulating reactor 20 that can be employed as the reactor 14 in FIG. 1 or the reactor 44 in FIG. 3 for making polyolefins is shown. The multizone circulating reactor 20 substitutes a series of separate reactors with a single reactor loop that permits different gas phase polymerization conditions in two sides due to use of a liquid barrier. In the multizone circulating reactor 20, a first zone starts out rich in olefin monomers, and optionally one or more comonomers. A second zone is rich in hydrogen gas, and a high velocity gas flow divides the growing resin particles out loosely. The two zones produce resins of different molecular weights and/or monomer compositions. Polymer granules grow as they circulate around the loop, building up alternating layers of each polymer fraction in an onion like fashion. Each polymer particle constitutes an intimate combination of both polymer fractions.

In operation, the polymer particles pass up through the fluidizing gas in an ascending side 24 of the loop and come down through the liquid monomer on a descending side 26. The same or different monomers (and again optionally one or more comonomers) can be added in the two reactor legs. The reactor uses the catalyst system described above.

In the liquid/gas separation zone 30, hydrogen gas is removed to cool and recirculate. Polymer granules are then packed into the top of the descending side 26, where they then descend. Monomers are introduced as liquids in this section. Conditions in the top of the descending side 26 can be varied with different combinations and/or proportions of monomers in successive passes.

Referring to FIG. 3, a high level schematic diagram of another system 40 for polymerizing olefins is shown. This system is ideally suited to make impact polymers. A reactor 44, such as a single reactor, a series of reactors, or a multizone circulating reactor is paired with a gas phase or a fluidized bed reactor 48 downstream containing the catalyst systems described above to make impact copolymers with desirable impact to stiffness balance or greater softness than made with conventional catalyst systems. Inlet 42 is used to introduce into the reactor 44 catalyst system components, olefins, optional comonomers, hydrogen gas, fluid media, pH adjusters, surfactants, and any other additives. Although only one inlet is shown, many often are employed. Through transfer means 46 the polyolefin made in the first reactor 44 is sent to a second reactor 48. Feed 50 is used to introduce catalyst system components, olefins, optional comonomers, fluid media, and any other additives. The second reactor 48 may or may not contain catalyst system components. Again, although only one inlet is shown, many often are employed. Once the second polymerization is complete, or as impact copolymers are produced, the polymer product is removed from the second reactor 48 via outlet 52 which leads to a collector 54. Collector 54 may include downstream processing, such as heating, extrusion, molding, and the like. At least one of the first reactor 44 and the second reactor 48 contains catalyst systems in accordance with the invention.

When making an impact copolymer, polypropylene can be formed in the first reactor while an ethylene propylene rubber can be formed in the second reactor. In this polymerization, the ethylene propylene rubber in the second reactor is formed with the matrix (and particularly within the pores) of the polypropylene formed in the first reactor. Consequently, an intimate mixture of an impact copolymer is formed, wherein the polymer product appears as a single polymer product. Such an intimate mixture cannot be made by simply mixing a polypropylene product with an ethylene propylene rubber product.

Although not shown in any of the figures, the systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (temperature, reaction time, pH, etc.) of the reactions, and the like, as instructed by the processor. The processor may contain or be coupled to a memory that contains data concerning various aspects of the polymerization process.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

The following examples illustrate the presently disclosed and claimed inventive concept(s). Unless otherwise indicated in the following examples and elsewhere in the specification and claims, all parts and percentages are by weight, all temperatures are in degrees Celsius, and pressure is at or near atmospheric pressure.

Example 1

Into a 250 ml Buchi reactor under $N_2$ a mixture of 3.3 g $MgCl_2$, 0.8 g phthalic anhydride, 50.92 g toluene, 6.41 g epichlorohydrin, and 6.70 g tributylphosphate was added. The mixture was heated for two hours while agitating at 400 rpm and 60° C. The reaction mixture was then cooled to −30° C. and 37.75 ml of $TiCl_4$ was added slowly while the reactor temperature was maintained below −26° C. After the addition the agitation rate was reduced to 200 rpm and the temperature was ramped from −26° C. to 0° C. in one hour then from 0° C. to 85° C. in one hour.

The mixture was held at 85° C. for 30 minutes and then 0.8 g of 1-ethyl-2-methoxy ethyl 4-methylbenzoate was added (mother liquor addition). The mixture was stirred at 85° C. for one hour and then filtered. The solids were re-suspended in 38 ml of toluene and 0.3 g of 1-ethyl-2-methoxy ethyl 4-methylbenzoate was added to the reactor (toluene addition). The mixture was agitated for one hour at 85° C. and 200 rpm. After filtered and washed twice with 65 ml toluene the mixture was left over night in toluene under $N_2$.

After filtering off the toluene 66.25 ml of 10-vol % $TiCl_4$ was added into toluene then heated to and held at 95° C. with 400 rpm agitation for one hour (1$^{st}$ activation). The solids were filtered then re-suspended in 66.25 ml of 10-vo % $TiCl_4$ in toluene. The mixture was held at 110° C. for thirty minutes after the solids were once again filtered. The step was repeated two more times. The final catalyst was washed four times with 65 ml of hexane then discharged from the reactor in hexane.

Propylene polymerization was performed in a 3.4 liter reactor. The reactor was purged at 100° C. under nitrogen for one hour. At room temperature, 1.5 ml of 25-wt % triethylaluminum (TEAL) in heptane was added into the reactor. Then 1.0 ml of 0.0768 M solution of cyclohexyl methyl dimethoxy silane followed by 1 ml of 1-wt % catalyst slurry was added into the reactor. The reactor was pressurized with $H_2$ to 3.5 psig then charged with 1500 ml propylene. The reactor was heated to then held at 70° C. for one hour. At the end of the hold, the reactor was vented and the polymer was recovered.

Yields: 288 g polypropylene. Catalyst activity: 37.3 kg/g. Xylene soluble: 4.7%.
MFR: 4.7 dg/min. Polydispersity index (PI): 3.6.

Example 2

The catalyst was synthesized under the same conditions as Example 1 except 0.8 g of 1-ethyl-2-methoxy ethyl 4-methylbenzoate was added into the mother liquor addition stage and 0.3 g of 1-ethyl-2-methoxy ethyl 4-methylbenzoate was added into the 1$^{st}$ activation stage.
Propylene polymerization was performed under the same conditions as Example 1.
Yield: 261 g polypropylene. Catalyst activity: 26.1 kg/g. Xylene soluble: 4.8%.
MFR: 5.7 dg/min. PI: 3.8.

Example 3

The catalyst was synthesized under the same conditions as Example 1 except 0.4 g of 1-ethyl-2-methoxy ethyl 4-methylbenzoate was added in the mother liquor addition. 0.8 g of 1-ethyl-2-methoxy ethyl 4-methylbenzoate was added into the mother liquor addition stage and 0.3 g of 1-methoxybutan-2-yl 4-methylbenzoate was added into the 1$^{st}$ activation stage.
Propylene polymerization was performed under the same conditions as Example 1.
Yield: 327 g polypropylene. Catalyst activity: 32.7 kg/g. Xylene soluble: 3.8%.
MFR: 4.6 dg/min. PI: 3.6

Example 4

The catalyst was synthesized under the same conditions as Example 1 except 0.8 g of 1-ethyl-2-methoxy ethyl 4-methylbenzoate was added into the mother liquor addition stage. 0.3 g of 1-ethyl-2-methoxy ethyl 4-methylbenzoate was added into the toluene cook and 0.3 g of 1-ethyl-2-methoxy ethyl 4-methylbenzoate was added into the 1$^{st}$ activation stage.
Propylene polymerization was performed under the same conditions as Example 1.
Yield: 300 g polypropylene. Catalyst activity: 30.0 kg/g. Xylene soluble: 4.3%.
MFR: 2.9 dg/min. PI: 3.8.

Example 5

The catalyst was synthesized under the same conditions as Example 1 except 1.3 g of 1-ethyl-2-methoxy ethyl 4-methylbenzoate was added into the mother liquor addition stage.
Propylene polymerization was performed under the same conditions as Example 1.
Yield: 360 g polypropylene. Catalyst activity: 36.0 kg/g. Xylene soluble: 5.9%.
MFR: 4.2 dg/min. PI: 3.6.

Example 6

The catalyst was synthesized under the same conditions as Example 1 except 0.95 g of 1-t-butyl-2-methoxy ethyl 4-methylbenzoate was added into the mother liquor addition stage and 0.35 g of 1-t-butyl-2-methoxy ethyl 4-methylbenzoate was added into the toluene cook.
Propylene polymerization was performed under the same conditions as Example 1.
Yield: 270 g polypropylene. Catalyst activity: 27.0 kg/g.
Xylene soluble: 6.6%.
MFR: 5.0 dg/min. PI: 4.1.

Example 7

The catalyst was synthesized under the same conditions as Example 1 except 1.06 g of 1-isononyl-2-methoxy ethyl 4-methylbenzoate was added into the mother liquor addition stage and 0.47 g of 1-isononyl-2-methoxy ethyl 4-methylbenzoate was added into the toluene cook.
Propylene polymerization was performed under the same conditions as Example 1.
Yield: 356 g polypropylene. Catalyst activity: 35.6 kg/g.
Xylene soluble: 3.1%.
MFR: 5.2 dg/min. PI: 4.0.

Example 8

The catalyst was synthesized under the same conditions as Example 1 except 1.16 g of 1-octyl-2-methoxy ethyl 4-methylbenzoate was added into the mother liquor addition stage and 0.51 g of 1-octyl-2-methoxy ethyl 4-methylbenzoate was added into the toluene cook.
Propylene polymerization was performed under the same conditions as Example 1.
Yield: 335 g polypropylene. Catalyst activity: 33.5 kg/g.
Xylene soluble: 4.5%. MFR: 4.3 dg/min. PI: 4.2.

Example 9

The catalyst was synthesized under the same conditions as Example 1 except 0.95 g of 1-butyl-2-methoxy ethyl 4-methylbenzoate was added into the mother liquor addition stage and 0.42 g of 1-butyl-2-methoxy ethyl 4-methylbenzoate was added into the toluene cook.
Propylene polymerization was performed under the same conditions as Example 1.
Yield: 392 g polypropylene. Catalyst activity: 39.2 kg/g.
Xylene soluble: 4.3%. MFR: 3.7 dg/min. PI: 4.1.

Example 10

The catalyst was synthesized under the same conditions as Example 1 except 1.26 g of 1-butyl-2-methoxy ethyl 2-methylbenzoate was added into the mother liquor addition stage.
Propylene polymerization was performed under the same conditions as Example 1.
Yield: 221 g polypropylene. Catalyst activity: 22.1 kg/g.
Xylene soluble: 5.2%. MFR: 14.6 dg/min.

Example 11

The catalyst was synthesized under the same conditions as Example 1 except 1.47 g of 1-hexyl-2-methoxy ethyl 2-methylbenzoate was added into the mother liquor addition stage.
Propylene polymerization was performed under the same conditions as Example 1.
Yield: 233 g polypropylene. Catalyst activity: 23.3 kg/g.
Xylene soluble: 5.2%. MFR: 17.4 dg/min.

It is, of course, not possible to describe every conceivable combination of the components or methodologies for purpose of describing the disclosed information, but one of ordinary skill in the art can recognize that many further combinations and permutations of the disclosed information are possible. Accordingly, the disclosed information is intended to embrace all such alternations, modifications and variations that fall within the spirit and scope of the appended claims. Furthermore, to the extent that the term "includes," "has," "involve," or variants thereof is used in either the detailed description or the claims, such term is intended to be inclusive in a manner similar to the term "comprising" as "comprising" is interpreted when employed as a transitional word in a claim.

What is claimed is:
1. A catalyst system comprising:
a solid catalyst component comprising a titanium compound, a magnesium compound, a halogen compound, and an internal electron donor compound;
an organoaluminum compound; and
an organosilicon compound,
wherein the internal electron donor compound is selected from the group consisting of 1-ethyl-2-methoxy ethyl 3-methylbenzoate, 1-ethyl-2-methoxy ethyl 3-ethylbenzoate, 1-ethyl-2-methoxy ethyl 3-propylbenzoate, 1-ethyl-2-methoxy ethyl 3-butylbenzoate, 1-propyl-2-methoxy ethyl 3-methylbenzoate, 1-propyl-2-methoxy ethyl 3-ethylbenzoate, 1-propyl-2-methoxy ethyl 3-propylbenzoate, 1-propyl-2-methoxy ethyl 3-butylbenzoate, 1-isopropyl-2-methoxy ethyl 3-methylbenzoate, 1-isopropyl-2-methoxy ethyl 3-ethylbenzoate, 1-isopropyl-2-methoxy ethyl 3-propyllbenzoate, 1-isopropyl-2-methoxy ethyl 3-butylbenzoate, 1-t-butyl-2-methoxy ethyl 3-methylbenzoate, 1-t-butyl-2-methoxy ethyl 3-ethylbenzoate, 1-t-butyl-2-methoxy ethyl 3-propylbenzoate, 1-t-butyl-2-methoxy ethyl 3-butylbenzoate, 1-isobutyl-2-methoxy ethyl 3-methylbenzoate, 1-isobutyl-2-methoxy ethyl 3-ethylbenzoate, 1-isobutyl-2-methoxy ethyl 3-propylbenzoate, 1-isobutyl-2-methoxy ethyl 3-butylbenzoate, 1-n-butyl-2-methoxy ethyl 3-methylbenzoate, 1-n-butyl-2-methoxy ethyl 3-ethylbenzoate, 1-n-butyl-2-methoxy ethyl 3-propylbenzoate, 1-n-butyl-2-methoxy ethyl 3-butylbenzoate, 1-n-pentyl-2-methoxy ethyl 3-methylbenzoate, 1-n-pentyl-2-methoxy ethyl 3-ethylbenzoate, 1-n-pentyl-2-methoxy ethyl 3-propylbenzoate, 1-n-pentyl-2-methoxy ethyl 3-butylbenzoate, 1-isopentyl-2-methoxy ethyl 3-methylbenzoate, 1-isopentyl-2-methoxy ethyl 3-ethylbenzoate, 1-isopentyl-2-methoxy ethyl 3-propylbenzoate, 1-isopentyl-2-methoxy ethyl 3-butylbenzoate, 1-n-hexyl-2-methoxy ethyl 3-methylbenzoate, 1-n-hexyl-2-methoxy ethyl 3-ethylbenzoate, 1-n-hexyl-2-methoxy ethyl 3-propylbenzoate, 1-n-hexyl-2-methoxy ethyl 3-butylbenzoate, 1-isohexyl-2-methoxy ethyl 3-methylbenzoate, 1-isohexyl-2-methoxy ethyl 3-ethylbenzoate, 1-isohexyl-2-methoxy ethyl 3-propylbenzoate, 1-isohexyl-2-methoxy ethyl 3-butylbenzoate, 1-n-heptyl-2-methoxy ethyl 3-methylbenzoate, 1-n-heptyl-2-methoxy ethyl 3-ethylbenzoate, 1-n-heptyl-2-methoxy ethyl 3-propylbenzoate, 1-n-heptyl-2-methoxy ethyl 3-butylbenzoate, 1-isoheptyl-2-methoxy ethyl 3-methylbenzoate, 1-isoheptyl-2-methoxy ethyl 3-ethylbenzoate, 1-isoheptyl-2-methoxy ethyl 3-propylbenzoate, 1-isoheptyl-2-methoxy ethyl 3-butylbenzoate, 1-n-octyl-2-methoxy ethyl 3-methylbenzoate, 1-n-octyl-2-methoxy ethyl 3-ethylbenzoate, 1-n-octyl-2-methoxy ethyl 3-propylbenzoate, 1-n-oc- tyl-2-methoxy ethyl 3-butylbenzoate, 1-isooctyl-2-methoxy ethyl 3-methylbenzoate, 1-isooctyl-2-methoxy ethyl 3-ethylbenzoate, 1-isooctyl-2-methoxy ethyl 3-propylbenzoate, 1-isooctyl-2-methoxy ethyl 3-butylbenzoate, 1-nonyl-2-methoxy ethyl 3-methylbenzoate, 1-nonyl-2-methoxy ethyl 3-ethylbenzoate, 1-nonyl-2-methoxy ethyl 3-propylbenzoate, 1-nonyl-2-methoxy ethyl 3-butylbenzoate, 1-i-nonyl-2-methoxy ethyl 3-methylbenzoate, 1-i-nonyl-2-methoxy ethyl 3-ethylbenzoate, 1-i-nonyl-2-methoxy ethyl 3-propylbenzoate, and 1-i-nonyl-2-methoxy ethyl 3 butylbenzoate.

2. The catalyst system of claim 1, wherein the titanium compound comprises a titanium-halogen bond and the internal electron donor compound is supported on a magnesium crystal lattice.

3. The catalyst system of claim 2, wherein the magnesium crystal lattice comprises a magnesium dichloride crystal lattice.

4. The catalyst system of claim 1, wherein the titanium compound comprises a titanium-halogen bond.

5. The catalyst system of claim 4, wherein the internal electron donor compound is supported on a magnesium crystal lattice.

6. The catalyst system of claim 5, wherein the magnesium crystal lattice comprises a magnesium dichloride crystal lattice.

7. The catalyst system of claim 4, wherein the titanium compound comprises $TiCl_4$ or $TiCl_3$.

8. The catalyst system of claim 1, wherein the organoaluminum compound comprises an alkyl-aluminum compound.

9. The catalyst system of claim 8, wherein the alkyl-aluminum compound comprises a trialkyl aluminum compound.

10. The catalyst system of claim 9, wherein the trialkyl aluminum compound is selected from the group consisting of triethylaluminum, triisobutylaluminum, and tri-n-octylaluminum.

11. The catalyst system of claim 1, wherein the organosilicon compound is represented by a general formula (IV):

$$SiRR'_m(OR'')_{3-m} \qquad (IV)$$

wherein R independently represents a cyclic hydrocarbon or substituted cyclic hydrocarbon group and $0<m<3$.

* * * * *